United States Patent

Roth et al.

[11] 4,003,864
[45] Jan. 18, 1977

[54] INTUMESCENT COMPOSITION

[75] Inventors: Shirley H. Roth, Highland Park; William S. Stoy, Princeton, both of N.J.

[73] Assignee: Cities Service Company, Tulsa, Okla.

[22] Filed: July 2, 1976

[21] Appl. No.: 702,152

[52] U.S. Cl. .................. 260/2.5 FP; 106/15 FP; 260/2.5 D; 260/2.5 F; 260/29.4 UA; 260/30.4 N; 260/30.6 R; 260/31.2 N; 260/32.4; 260/72.5; 260/834; 260/851; 260/DIG. 24; 427/195; 427/374 R; 428/524; 428/460; 428/529; 428/531; 428/921

[51] Int. Cl.² .......................... C08J 9/02

[58] Field of Search ............ 260/851, 834, 2.5 D, 260/2.5 FP, DIG. 24, 2.5 F

[56] References Cited
UNITED STATES PATENTS

| | | | |
|---|---|---|---|
| 3,912,845 | 10/1975 | Roth | 260/72.5 |
| 3,922,251 | 11/1975 | Roth | 260/30.2 |

*Primary Examiner*—Morton Foelak
*Attorney, Agent, or Firm*—Patricia J. Hogan

[57] ABSTRACT

Intumescent amine-aldehyde copolymer compositions having improved UV stability are obtained by incorporating about 0.5–75% by weight of a polyol polyacrylate or polyol polymethacrylate into an intumescent composition comprising a low molecular weight, water-insoluble amine-aldehyde copolymer consisting essentially of repeating units which correspond to the formula:

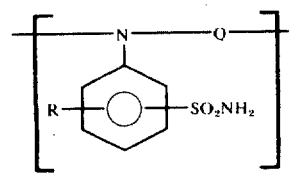

wherein Q is the residue of an alkanal containing 1–5 carbon atoms and R is hydrogen, alkyl, haloalkyl, alkoxy, haloalkoxy, halo, nitro, acetamido, or sulfonamido. The preferred compositions are those in which the amine-aldehyde copolymer is a sulfanilamide-formaldehyde copolymer and the polyol ester is a liquid ester.

10 Claims, No Drawings

INTUMESCENT COMPOSITION

BACKGROUND OF THE INVENTION

1. Field of the Invention

This invention relates to intumescent amine-aldehyde copolymer compositions and more particularly relates to such compositions having improved UV stability.

2. Description of the Prior Art

As taught in U.S. Pat. Nos. 3,912,845 and 3,922,251, valuable intumescent compositions may be obtained by the use of low molecular weight, water-insoluble amine-aldehyde copolymers consisting essentially of repeating units which correspond to the formula:

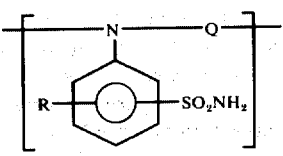

wherein Q is the residue of an alkanal containing 1–5 carbon atoms and R is hydrogen, alkyl, haloalkyl, alkoxy, haloalkoxy, halo, nitro, acetamido, or sulfonamido. These compositions are satisfactory for many applications but have the disadvantage of being susceptible to discoloration by ultra-violet light. Attempts to solve this problem by the incorporation of conventional UV stabilizers have been unsuccessful.

SUMMARY OF THE INVENTION

An object of this invention is to provide novel intumescent compositions comprising amine-aldehyde copolymers.

Another object is to provide such compositions having improved UV stability.

These and other objects are attained by incorporating about 0.5–75% by weight of a polyol polyacrylate or polyol polymethacrylate into an intumescent composition comprising a water-insoluble amine-aldehyde copolymer having a number average molecular weight of about 350–2000 and consisting essentially of repeating units corresponding to the formula:

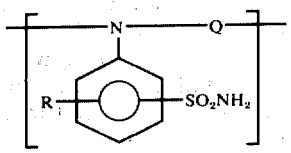

wherein Q is the residue of an alkanal containing 1–5 carbon atoms and R is hydrogen, alkyl, haloalkyl, alkoxy, haloalkoxy, halo, nitro, acetamido, or sulfonamido.

DESCRIPTION OF THE PREFERRED EMBODIMENTS

The amine-aldehyde copolymers of the invention are the preferred copolymers of U.S. Pat. No. 3,922,251, the teachings of which are incorporated herein by reference. Briefly, they are water-insoluble, organic solvent-soluble copolymers at (A) a sulfanilamide-type amine, such as sulfanilamide, o-aminobenzenesulfonamide, m-aminobenzenesulfonamide, 4-amino-2-ethylbenzenesulfonamide, 2-amino-3-chloromethylbenzenesulfonamide, 3-amino-2-butoxybenzenesulfonamide, 4-amino-3-bromomethoxybenzenesulfonamide, 4-amino-2-chlorobenzenesulfonamide, 2-amino-4-bromobenzenesulfonamide, 4-amino-2-nitrobenzenesulfonamide, 4-amino-2-acetamidobenzenesulfonamide, 4-amino-1,3-disulfonamidobenzene, etc., and mixtures thereof, and (B) an alkanal containing 1–5 carbon atoms, such as formaldehyde, acetaldehyde, propionaldehyde, butyraldehyde, pentaldehyde, and mixtures thereof. As indicated above, they have number average molecular weights of about 350–2000 and are characterized by having the sulfanilamide-type residues bonded to the aldehyde residues through the nitrogen of the amino group. They are preferably sulfanilamide-formaldehyde copolymers.

The polyol esters of the invention are polyacrylates and polymethacrylates of polyols, such as ethylene glycol, diethylene glycol, triethylene glycol, tetraethylene glycol, pentaerythritol, polyethylene glycols, 1,3-butylene glycol, 1,4-butylene glycol, 1,6-hexanediol, trimethylolpropane, a diglycidyl ether of bisphenol A [bis(4-hydroxyphenyl) dimethylmethane], etc. Exemplary of such utilizable compounds are ethylene glycol diacrylate, diethylene glycol diacrylate, triethylene glycol diacrylate, tetraethylene glycol diacrylate, pentaerythritol tetraacrylate, polyethylene glycol 200 diacrylate, 1,3-butylene glycol diacrylate, 1,4-butylene glycol diacrylate, 1,6-hexanediol diacrylate, trimethylolpropane triacrylate, a diacrylate of a liquid diglycidyl ether of bisphenol A, etc., the corresponding polymethacrylates, and mixtures thereof. Preferably they are liquid esters. The polyol ester is employed in an amount such as to constitute about 0.5–75%, preferably about 1–60%, and most preferably about 10–60%, based on the weight of the amine-aldehyde resin.

The compositions of the invention are prepared by blending the amine-aldehyde intumescent agent with the polyol ester UV stabilizer and any optional ingredients in any suitable manner, e.g., by liquid or dry blending of the ingredients at ambient or elevated temperatures, by dissolving the intumescent agent in a solvent, mixing the other ingredients therewith, and then evaporating the solvent by air- or oven-drying, etc.

The compositions may contain up to about 80%, based on the total weight of the composition, of one or more of the other ingredients conventionally used in intumescent compositions. Such optional ingredients include, e.g., binders, plasticizers, stabilizers, dispersing agents, pigments, driers, biocides, anti-foamers, thickeners, protective colloids, fillers, blowing agents, flame retardants, other intumescent agents, etc.

For use in protecting a substrate from heat and fire, the intumescent compositions of the invention may be applied in any suitable manner, e.g., electrodeposition, spraying of powdered intumescent composition onto an adhesive substrate, spraying of powdered intumescent composition onto a substrate to which it is adhered by subsequent melting and cooling, application of a hot melt, application of a paint comprising 10–90% by weight of solids dispersed in a suitable liquid medium, e.g., water or a solvent or solvent mixture, etc. Ordinarily the intumescent composition is applied to a substrate so as to deposit a coating having a dry thickness of about 0.02–19 mm.

The intumescent compositions of the invention are efficient, have low moisture sensitivity, and intumesce to form foams having good volume, cell structure, and adherence to substrates, such as wood, paper, metal, and plastics. They are particularly advantageous in that they have better UV stability than the intumescent agents alone, i.e., the intumescent agents of U.S. Pat. Nos. 3,912,845 and 3,922,251.

The following examples are given to illustrate the invention and are not intended as a limitation thereof. Unless otherwise specified, quantities mentioned are quantities by weight. The sulfanilamide-formaldehyde copolymer of the examples is a copolymer having a number average molecular weight of about 350–2000 and prepared in accordance with the teachings of U.S. Pat. No. 3,922,251 so that the sulfanilamide units correspond to the formula:

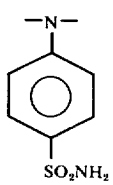

EXAMPLE I - CONTROL

Dissolve 100 parts of a sulfanilamide-formaldehyde copolymer in 103 parts of a 95/2.5/2.5 mixture of 2-methoxyethanol, 2-nitropropane, and butyl acetate. Apply the composition to Morest paper to form a coating. After the coating has hardened, place the coated paper in a fadeometer and subject it to ultra-violet light for 210 hours. Then measure the DCYB (difference in color between yellow and blue) with a spectrophotometer. The coated paper is yellow and has an assigned DCYB value of 0 MacAdam unit.

EXAMPLE II

Repeat Example I except for mixing, respectively, 1, 5, and 10 parts of a commercial diacrylate of a liquid diglycidyl ether of bisphenol A with the copolymer solution before applying the compositions to Morest paper. After the UV exposure, the coated papers are less yellow than the control and have respective DCYB values of −2.9, −4.2, and −7.6 MacAdam units.

EXAMPLE III

Repeat Example I except for mixing, respectively, 1, 5, and 10 parts of trimethylolpropane triacrylate with the copolymer solution before applying the compositions to Morest paper. After the UV exposure, the coated papers are less yellow than the control and have respective DCYB values of −2.2, −3.6, and −4.7 MacAdam units.

EXAMPLE IV

Repeat Example I except for mixing, respectively, 1, 5, and 10 parts of pentaerythritol tetraacrylate with the copolymer solution before applying the compositions to Morest paper. After the UV exposure, the coated papers are less yellow than the control and have respective DCYB values of −6.9, −9.5, and −17.1 MacAdam units.

EXAMPLE V

Repeat Example I except for mixing 5 parts of diethylene glycol diacrylate with the copolymer solution before applying the composition to Morest paper. After the UV exposure, the coated paper is less yellow than the control and has a DCYB value of −8.2 MacAdam units.

EXAMPLE VI — CONTROL

Repeat Example I except for mixing, respectively, 5 parts of ethyl acrylate and 5 parts of methyl acrylate with the copolymer solution before applying the compositions to Morest paper. After the UV exposure, the coated papers are substantially as yellow as the Example I control and have respective DCYB values of −0.3 and −0.9 MacAdam units.

EXAMPLE VII — CONTROL

Dissolve 100 parts of a sulfanilamide-formaldehyde copolymer in 108 parts of a 102/6 mixture of 2-methoxyethanol and 2-nitropropane. While agitating the solution, add 13 parts of tris(2,3-dibromopropyl) phosphate and about 4 parts of tricresyl phosphate. Apply the composition to a poplar panel and allow it to harden. The coated panel exhibits intumescence when tested in accordance with the 2-foot tunnel test described in H. L. Vandersall, "The Use of a Small Flame Tunnel for Evaluating Fire Hazard," JOURNAL OF PAINT TECHNOLOGY, Vol. 39, No. 55, pp. 494–500 (1967). However, after exposure to ultra-violet light, it is quite yellow.

EXAMPLE VIII

Repeat Example VII except for also mixing 19 parts of pentaerythritol tetraacrylate and 19 parts of hexanediol diacrylate with the copolymer solution. The coated panel is less yellow than the control panel after exposure to ultra-violet light, and it exhibits even better intumescence than the control panel.

EXAMPLE IX

Repeat Example VII except for also mixing 60 parts of pentaerythritol tetraacrylate with the coplymer solution. The coated panel is less yellow than the control panel after UV exposure, and it exhibits even better intumescence than the control panel.

EXAMPLE X

Repeat Example VII except for also mixing 60 parts of a commercial diacrylate of a liquid diglycidyl ether of bisphenol A with the copolymer solution. The coated panel is less yellow than the control panel after UV exposure, and it exhibits even better intumescence than the control panel.

Similar results are observed when the examples are repeated except that the polyol polyacrylates of the examples are replaced by the polyol polyacrylates and polymethacrylates taught to be their equivalents in the specification.

It is obvious that many variations may be made in the products and processes set forth above without departing from the spirit and scope of this invention.

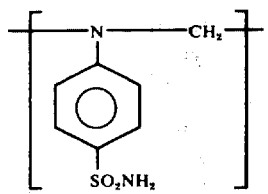

What is claimed is:

1. An intumescent composition comprising (A) a water-insoluble amine-aldehyde copolymer having a number average molecular weight of about 350–2000 and consisting essentially of repeating units corresponding to the formula:

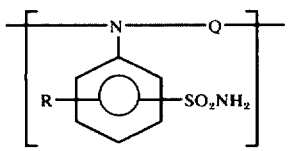

wherein Q is the residue of an alkanal containing 1–5 carbon atoms and R is hydrogen, alkyl, haloalkyl, alkoxy, haloalkoxy, halo, nitro, acetamido, or sulfonamido and (B) about 0.5–75%, based on the weight of the amine-aldehyde resin, of a polyol ester selected from the group consisting of polyacrylates and polymethacrylates.

2. The composition of claim 1 wherein the concentration of polyol ester is about 1–60%, based on the weight of the amine-aldehyde resin.

3. The composition of claim 2 wherein the concentration of polyol ester is about 10–60%, based on the weight of the amine-aldehyde resin.

4. The composition of claim 1 wherein the polyol ester is a liquid ester.

5. The composition of claim 4 wherein the polyol ester is a diacrylate of a liquid diglycidyl ether of bisphenol A.

6. The composition of claim 4 wherein the polyol ester is trimethylolpropane triacrylate.

7. The composition of claim 4 wherein the polyol ester is pentaerythritol tetraacrylate.

8. The composition of claim 4 wherein the polyol ester is 1,6-hexanediol diacrylate.

9. The composition of claim 4 wherein the polyol ester is diethylene glycol diacrylate.

10. The composition of claim 1 wherein the repeating units of the copolymer correspond to the formula: